Jan. 8, 1946. L. E. ROLLINS 2,392,553
MOIST AIR HEATING AND COOLING SYSTEM
Filed May 5, 1943

Leonard E. Rollins   INVENTOR.

Patented Jan. 8, 1946

2,392,553

UNITED STATES PATENT OFFICE 2,392,553

MOIST AIR HEATING AND COOLING SYSTEM

Leonard E. Rollins, Minneapolis, Minn.

Application May 5, 1943, Serial No. 485,961

13 Claims. (Cl. 257—3)

This invention relates to a moist air heating and cooling system in which moist air is used as a heat conveying medium, both singly and in combination with circulated air.

One object of the invention is to provide a simpler and more efficient system than steam or vapor for heating, using lower pressures, lower temperatures, and lighter equipment, omitting steam traps and air vents, and supplying heat at lower temperatures than required to vaporize water with heat.

Another object of the invention is to provide a heating system with better circulation than hot water with less time for heating up, lighter equipment and without danger of freezing in exposed portions during periods when not in operation.

Another object of the invention is to provide a heating system that requires smaller quantities of air and smaller air ducts than hot air heating systems using sensible heat only as the basis of heat transfer, and allows the heat dissipating surfaces to be located anywhere in the enclosures.

Another object of the invention is to differentiate in the humidity of each of the enclosures served by the same system of heated, moist air.

A further object of the invention is to allow the use of tap water, well water or refrigerated water for cooling during summer seasons and for preventing the temperature of the enclosures from getting too warm during mild weather conditions of the heating seasons.

Referring to the drawing.

Figures 1, 2, 3:
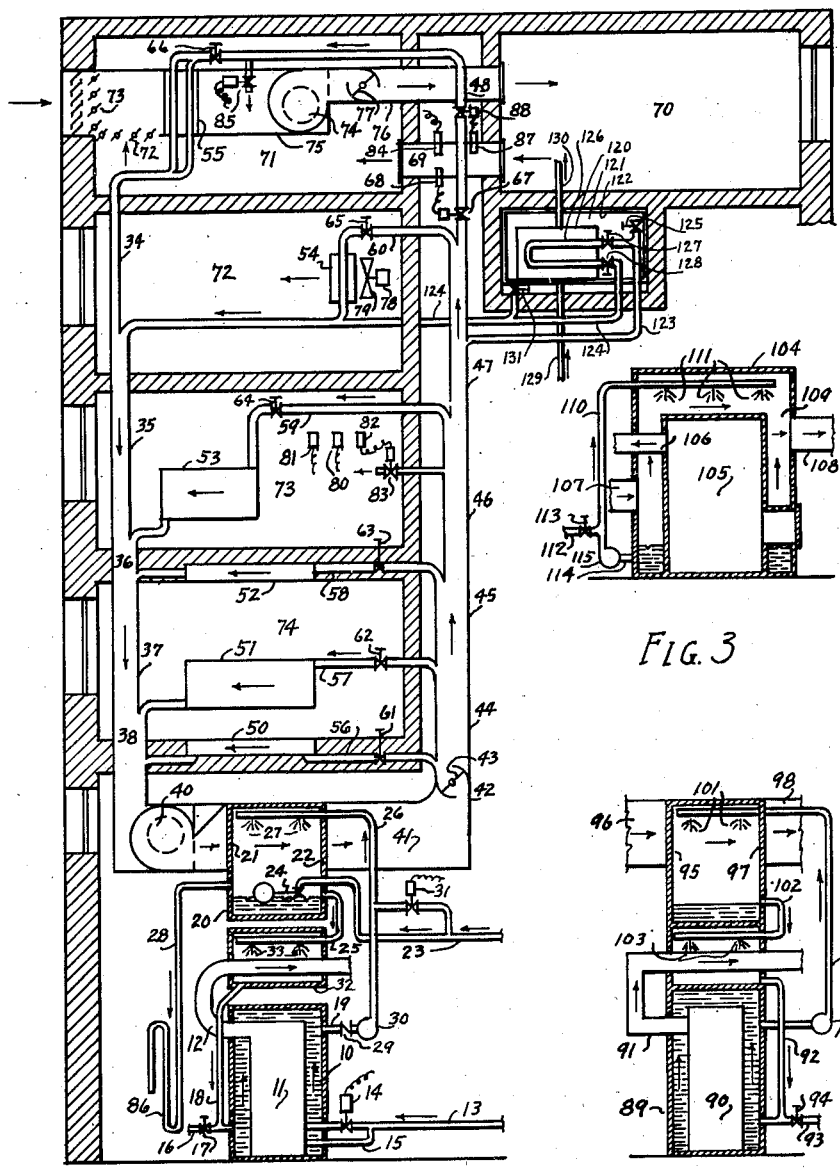
Figure 1 is a diagram of the complete system applied in four different ways to four separate enclosures.
Figure 2 shows the water heating means, the air saturating means, and the economizer means assembled in one case.
Figure 3 shows the water heating means and the air saturating means combined with the air heating means in one case.

Referring specifically to Figure 1; the case 10 encloses the water heating means comprising the furnace 11, with the smoke flue 12, the gas supply pipe 13, with the automatic control valve 14, the pipe 15 supplying the pilot light, the make up water supply pipe 16 with the valve 17. Recirculated water is supplied through the pipe 18 and heated water is drawn away by the pipe 19.

The case 20 encloses the air saturator, comprising the air inlet 21, the air outlet 22, the make up water supply pipe 23 controlled by the float valve 24, the recirculated water outlet 25, the heated water supply pipe 26 with the spray nozzles 27, and the overflow pipe 28. Recirculated water is supplied to the case 20 from the case 10, through the pipe 19, the check valve 29 by the pump 30 through the pipe 26. Cold water is supplied to the pipe 26, controlled by the automatic valve 31.

The case 32 encloses the economizer, comprising the smoke flue 12, the water supply pipe 25 with the spray nozzles 33, and the water discharge pipe 18.

Air is drawn through the return ducts 34, 35, 36, 37, and 38 by the fan 40 and discharged through the air inlet 21 and the air outlet 22 of the saturator, through the ducts 41, 42, controlled by the damper 43, and through the ducts 44, 45, 46, 47, and 48, through the radiators 50, 51, 52, and 53, and through the heating coils 54 and 55 by the ducts 56, 57, 58, 59, 60 and 48, controlled by the hand valves 61, 62, 63, 64, 65, and 66, and the automatic valve 67. The hand valves 61 to 65 can be individually operated by thermostatic valves to control the amount of moist air supplied to each room if desired, similar to the following description for the operation of valve 67. The thermostat 68 in the return air duct 69 operates the automatic valve 67 to control the temperature of the air in the return air duct 69 during the heating season, which controls the temperature of the air in the enclosure 70.

The enclosure 70 is heated and ventilated by means of recirculated air from the enclosure 70 drawn through the duct 69 into the enclosure 71, through the damper 72, mixed with fresh air drawn from outside through the damper 73, through the heating coil 55 by the fan 74, which draws the air through the duct 75 and discharges through the duct 76, controlled by the damper 77 and discharging into the enclosure 70.

The temperature of the enclosure 72 can also be controlled during the heating season by means of a thermostat which controls the operation, automatically, of the motor 78, which drives the fan 79 for blowing air through the heating coil 54. The average temperature of the enclosures can be automatically controlled by means of the thermostat 80 which controls the operation of the gas supply valve 14.

During mild weather of the heating season when the system overheats the enclosures and the average temperature of the enclosures exceeds some predetermined temperature for which the thermostat 81 is set, the said thermostat 81 operates the automatic valve 31 to supply cold water through the pipe 26 to the spray nozzles 27 to lower the temperature of the air passing through the saturator and to lower the temperature of the enclosures.

The temperature of the enclosures can be maintained by using gas for fuel, or oil, coal or electricity. In case coal is to be used and the thermostat 80 used to operate dampers instead of a gas valve, the operation of the thermostat 81 as described in the preceding paragraph becomes more important.

The humidity of the enclosures 72 and 74 can be individually controlled as shown for enclosure 73, which comprises the humidostat 82 controlling the automatic valve 83 which admits water vapor from moist air duct 46 into the enclosure to maintain proper humidity conditions during the heating season.

The humidity of the enclosure 70 is maintained by means of the humidostat 84 in the return air duct 69 which operates the automatic valve 85 discharging water vapor from the moist air duct 48 into the air supply for the enclosure 70 to maintain proper humidity conditions during the heating season.

The moist air circuit has a high vapor pressure and is kept as a closed circuit by means of the seal of water in the loop 86 of the overflow pipe 28. Increase of air pressure is caused by increase in temperature and by air in the supply water. Loss of air pressure is caused by the means of humidification. The height of the water seal should be slightly in excess of the maximum pressure head required.

The same system can be used for summer cooling and by using the thermostat 81 to control the average temperature of the enclosures without any changes. In this case the thermostat 81 would automatically control the amount of cold water supplied by the valve 31 to control the temperature of the enclosure 73. The individual control of temperature for any or all of the enclosures can be attained by changing or adding automatic valves to the hand valves for regulating the amount of cold air circulated in contact with the enclosures. The enclosure 72 can be further controlled for temperature by automatically controlling the operation of the motor and fan.

The temperature of the enclosure 70 can be further varied by varying the proportions of fresh and recirculated air during mild heating seasons or hot weather. The air leakage around doors and windows will generally allow for sufficient fresh air to be taken into the system to maintain static balance.

The individual control of the enclosure 70 for summer cooling is attained by means of the thermostat 87 located in the return air duct 69 and regulating the amount of moist, cold air passing through the cooling coil 55 by means of the automatic valve 88 to control the temperature of the air in the discharge duct 76 to control the temperature of the enclosure 70 as measured in the return duct 69.

The thermostats, humidostats, and automatic valves herein referred to are intended to cover thermostats and humidostats operating air, electric, or vapor circuits and actuated by temperature and humidity, respectively, for the operation of automatic valves controlling the flow of air or water. The invention is not limited to any specific equipment.

Referring to Figure 2; the case 89 containing the furnace 90 surrounded with water and having the smoke pipe 91, in the lower portion, with recirculated water supply through the pipe 92 and make up water supplied through the pipe 93, controlled by the valve 94. The upper part of the case 89 has an air inlet 95 from the duct 96 and an air outlet 97 for the duct 98, with the water supply pipe 99, supplied with heated water from the lower portion by the pump 100 and discharged by the sprays 101 in contact with the flow of air, a tank in the lower part of the upper portion with an overflow drain pipe 102 and the sprays 103 supplying water over the smoke flue 91 to preheat the water by utilizing waste heat from the flue gases. The economizer has the drain pipe 92 supplying recirculated water to the lower section.

The use of the economizer in both Figures 1 and 2 is the same. Figure 2 is a simplified drawing of Figure 1, and has all of the attachments of Figure 1, the only difference being the connection, that Figure 1 is shown in three parts and Figure 2 is shown all assembled in one case for simplicity.

Figure 3 shows a case 104, containing a furnace 105 with a smoke flue 106, and inlet for air 107, an outlet for air 108, a space for water, and a space for water and air to mix 109 surrounding the furnace 105, a recirculated water supply pipe 110, and sprays 111. The case has a make up water supply pipe 112, controlled by the valve 113. Recirculated water is drawn from the case through the pipe 114 by the pump 115 and discharged through the pipe 110 and the sprays 111.

Figures 2 and 3 are simplified diagrams of alternate equipment to that shown in Figure 1 and are intended to have the same attachments, where possible, such as cooling water supply, overflow pipes, water seals, etc.

The heating radiators and heating coils as indicated in Figure 1 are also intended for cooling, and the system changes from a heating system to a cooling system, automatically by changing the temperature of the water in the saturator.

The reason for using moist air instead of dry air as a heat conveying medium is due to its much greater heat carrying capacity and to take advantage of releasing the heat of vaporization when condensing the moisture similar to a steam system without the high pressure and temperature.

There is less heat loss from the ducts carrying moist air than from steam or hot water piping due to a lower factor of conductivity. The overall efficiency for a system heating water and spraying the water in contact with a flow of air is greater than a boiler producing steam by evaporation under pressure due to the lower temperatures required and the greater surface contact of the heated water with the air.

The water for building service can be heated by the same system using the water heating and storage tank 120, in the enclosure 121, and insulated with the lining 122. Heated, moist air is circulated through the enclosure 121 and around the tank 120 by the ducts 123 and 124 and controlled by the valves 125 and 131. Heated air can be circulated through the heating coil 126 in indirect contact with the water in the tank 120 and is regulated by the valves 127 and 128. Cold water is supplied to the tank 120 by the pipe 129 and hot water is discharged from the tank by the pipe 130.

What I claim is:
1. The method of heating one or more enclosures, which comprises heating water to a temperature less than that of boiling, circulating the heated water in direct contact with a flow of air and circulating the heated air in indirect contact with the said enclosures.

2. The method of heating an enclosure, which comprises heating water, circulating the heated water in direct contact with a primary circuit of air, circulating the primary circuit of heated air in indirect contact with a secondary circuit of air, wasting a portion of air from the secondary circuit of heated air and replenishing with fresh air, and recirculating the said secondary circuit of heated air through the said enclosure.

3. The method of controlling the temperature of an enclosure, which comprises heating water, circulating the heated water in direct contact with a flow of air, circulating the heated air in indirect contact with the said enclosure, and automatically regulating the temperature of the said heated water to control the temperature of the said enclosure.

4. The method of controlling the temperature of an enclosure, which comprises heating water, circulating the heated water in direct contact with a primary circuit of air, circulating the primary circuit of heated air in indirect contact with a secondary circuit of air, wasting a portion of air from the secondary circuit of heated air and replenishing with fresh air, recirculating the said secondary circuit of heated air through the said enclosure, and automatically regulating the circulation of the said primary circuit of heated air in indirect contact with the said secondary circuit of air to control the temperature of the said enclosure.

5. Heating apparatus, comprising means for heating water, means for circulating the heated water in direct contact with air, means for circulating the heated air in indirect contact with one or more enclosures, means for automatically regulating the temperature of the said heated water, and means for automatically replacing the said heated water with colder water to prevent the average temperature of the said enclosures from exceeding some predetermined degree.

6. Heating apparatus, comprising means for heating water, means for circulating the heated water in direct contact with a primary circuit of air, means for circulating the primary circuit of heated air in indirect contact with a secondary circuit of air, means for wasting a portion of air from the secondary circuit of heated air and replenishing with fresh air, means for recirculating the said secondary circuit of heated air through enclosures, means for automatically regulating the temperature of the said heated water, and means for automatically replacing the said heated water with colder water to prevent the average temperature of the said enclosures from exceeding some predetermined degree.

7. The method of cooling one or more enclosures, which comprises circulating cool water in direct contact with air and circulating the cooled air in indirect contact with the said enclosures.

8. The method of cooling one or more enclosures, which comprises circulating cool water in direct contact with a primary circuit of air, circulating the primary circuit of cooled air in indirect contact with a secondary circuit of air, wasting a portion of air from the secondary circuit of cooled air and replenishing with fresh air, and circulating the said secondary circuit of cooled air through the said enclosures.

9. The method of controlling the temperature of one or more enclosures, which comprises circulating cool water in direct contact with air, circulating the cooled air in indirect contact with the said enclosures, wasting a portion of the cool water and replenishing with cold water, and automatically regulating the amount of cold water added to the cool water to control the average temperature of the said enclosures.

10. The method of controlling the temperature of one or more enclosures, which comprises circulating cool water in direct contact with a primary circuit of air, circulating the primary circuit of cooled air in indirect contact with a secondary circuit of air, wasting a portion of air from the said secondary circuit of cooled air and replenishing with fresh air, circulating the said secondary circuit of cooled air through the said enclosures, wasting a portion of the cool water and replenishing with cold water, and automatically regulating the amount of cold water added to the cool water to control the average temperature of the said enclosures.

11. In heating apparatus using moist air as a heat conveying medium, the combination of means for causing a circuit of water, means for causing a circuit of air, means for heating the said circuit of water, means for directly contacting the said circuit of air with the circuit of heated water and for transferring water vapor from the heated water to the air, means for indirectly contacting the said circuit of water with waste heat from the said means for heating the circuit of water, means for automatically adding water, means for automatically wasting water, and means for automatically sealing the said circuit of air against loss of water vapor.

12. In heating apparatus using moist air as a heat conveying medium, a case having in the lower portion means for heating water, in the upper portion means for atomizing and directly contacting the heated water with a flow of air, in the middle portion means for indirectly contacting the waste water from the upper portion with waste heat from the lower portion, and means for circulating water through the said lower portion, the said upper portion, and the said middle portion.

13. In heating apparatus using moist air as a heat conveying medium, the combination of means for causing a circuit of water, means for causing a circuit of air, means for heating the said circuit of water, means for using the heated water for heating the said circuit of air, means for automatically adding water, means for automatically wasting water, and means for automatically sealing the said circuit of air against loss of water vapor.

LEONARD E. ROLLINS.